United States Patent [19]

Kodama et al.

[11] Patent Number: 5,349,031
[45] Date of Patent: Sep. 20, 1994

[54] FLUORINE-CONTAINING COATING COMPOSITION

[75] Inventors: Shun-ichi Kodama; Yasuyuki Sasao; Ryuichi Miura, all of Kawasaki, Japan

[73] Assignee: Asahi Glass Company Ltd., Tokyo, Japan

[21] Appl. No.: 50,648

[22] Filed: Apr. 22, 1993

[30] Foreign Application Priority Data

Apr. 24, 1992 [JP] Japan ................................. 4-154053

[51] Int. Cl.$^5$ ................................. C08F 8/00
[52] U.S. Cl. ................................. 525/386; 525/326.3
[58] Field of Search ......................................... 525/386

[56] References Cited

U.S. PATENT DOCUMENTS

| | | |
|---|---|---|
| 4,015,057 | 3/1977 | Gall . |
| 4,046,727 | 9/1977 | Itoh et al. ............................ 525/386 |
| 4,151,342 | 4/1979 | Uchino et al. .................. 525/326.3 |
| 5,147,934 | 9/1992 | Ito et al. ............................ 525/326.3 |

FOREIGN PATENT DOCUMENTS 0301557  2/1989  European Pat. Off. .
0312834  4/1989  European Pat. Off. .

*Primary Examiner*—Bernard Lipman
*Attorney, Agent, or Firm*—Oblon, Spivak, McClelland, Maier & Neustadt

[57] ABSTRACT

A fluorine-containing coating composition comprising from 30 to 90 wt % of a fluorine-containing copolymer containing units derived from a fluoroolefin and units derived from a vinyl ether and having a hydroxyl value of from 30 to 150 (mgKOH/g) and an epoxy equivalent of from 300 to 2,000 (g/eq) and from 10 to 70 wt % of a curing agent having carboxylic acid groups or a derivative thereof.

5 Claims, No Drawings

FLUORINE-CONTAINING COATING COMPOSITION

The present invention relates to a fluorine-containing coating composition. More particularly, it relates to a fluorine-containing coating composition which is excellent in the acidic rain resistance, the weather resistance, the chemical resistance, the scratch resistance and the operation efficiency including the compatibility with a curing component and the curing speed.

Heretofore, it has been common to use a coating material so-called an acrylmelamine type using a melamine resin and an acrylic resin having hydroxyl groups and acid groups, as a top coat for e.g. automobile bodies, since it is easy to handle in one-pack type and the cost performance is good. However, reflecting the social requirement for the global environment in recent years, it has been required to impart chemical resistance such as acidic rain resistance. The conventional acrylmelamine type coating material can hardly meet such a requirement, since the melamine resin and the melamine crosslinking sites are poor in the acid resistance, and the acrylic resin itself tends to undergo hydrolysis by an acid.

Under these circumstances, a coating composition of so-called new curing system has been proposed and practically used to some extent wherein epoxy groups or carboxylic acid groups are provided to an acrylic resin to constitute main curing sites, and a melamine resin, a blocked isocyanate or a compound having a silanol group is incorporated for the purpose of treating secondary hydroxyl groups which are formed by a side crosslinking reaction or a reaction of epoxy groups with carboxylic acid groups and which impair the chemical resistance. However, such a coating composition is still being developed by manufacturers of coating materials and has not yet been established as a consistent blend system. Besides, it contains an acrylic resin as the main component, and it has a drawback such as hydrolysis due to the acid of the acrylic resin itself, whereby there is a limit in the improvement of the acid resistance. For example, it tends to be weak against an organic acid such as formic acid. Further, the level of weather resistance is also governed by the acrylic resin itself and is not so much different from that of conventional products. Further, a fluorine-containing composition proposed by the present inventors and shown in e.g. Japanese Patent Application No. 296219/1991, employs a melamine resin as a curing agent to provide outstanding weather resistance as well as acidic rain resistance, chemical resistance and scratch resistance superior to the acrylic new curing system while maintaining the handling efficiency at the same level as the acrylic melamine system. Such an excellent performance is believed to be attributable to the excellent acid resistance and chemical resistance and the low surface tension of the fluorine resin which effectively prevent external environmental factors from entering into the melamine resin component.

For further improvements of various properties, however, a study has been made to find out whether or not it is possible to improve the performance of the acrylic new curing system by a combination of the fluorine-containing coating composition with the acrylic new curing system. In this study, there has been a problem that with a fluorine-containing resin having epoxy groups, the excellent durability and handling efficiency of the fluorine-containing coating composition can not be obtained unless it has a specific structure in a combination with a curing agent having carboxylic acid groups or a derivative thereof, as the main curing component.

It is an object of the present invention to overcome the above problems inherent to the prior art and to provide a fluorine-containing coating composition excellent in the weather resistance, the acidic rain resistance, the chemical resistance, the scratch resistance and the handling efficiency, durability and storage stability as a coating material.

The present invention has been made to accomplish the above object and provides a fluorine-containing coating composition comprising from 30 to 90 wt % of a fluorine-containing copolymer containing units derived from a fluoroolefin and units derived from a vinyl ether and having a hydroxyl value of from 30 to 150 (mgKOH/g) and an epoxy equivalent of from 300 to 2,000 (g/eq) and from 10 to 70 wt % of a curing agent having carboxylic acid groups or a derivative thereof.

Now, the present invention will be described in detail with reference to the preferred embodiments.

As the fluorine-containing copolymer for the fluorine-containing coating composition of the present invention, a fluorine-containing copolymer containing units derived from a fluoroolefin and units derived from a vinyl ether and having a hydroxyl value of from 30 to 150 (mgKOH/g) and an epoxy equivalent of from 300 to 2,000 (g/eq), is used. By virtue of the fluoroolefin units and the vinyl ether units, the alternating copolymerizability is high and the yield in the synthesis is high, whereby it is possible to obtain a solvent-soluble fluorine-containing copolymer excellent in the weather resistance. Since it has a hydroxyl value of from 30 to 150 (mgKOH/g) and an epoxy equivalent of from 300 to 2,000 (g/eq), it is possible to secure compatibility and curability with a curing agent having carboxylic acid groups or a derivative thereof and a crosslinking density, whereby it is possible to secure the weather resistance as well as the acidic rain resistance, the chemical resistance, the scratch resistance, the handling efficiency, the curability and storage stability as a fluorine-containing coating composition.

If the hydroxyl value is less than the above range, the compatibility with a curing agent tends to be poor, whereby there will be difficulties in the storage stability or curability as a coating material or in the transparency and flatness of a coating film. Further, when an acid anhydride is used as a curing agent, the catalytic action by the ring opening of the acid anhydride can not adequately be obtained, whereby curing will be inferior. If the hydroxyl value exceeds the above range, it tends to be difficult to secure the solubility in a common solvent for coating materials, since it tends to be soluble only in a polar solvent.

If the epoxy equivalent is less than the above range, the crosslinking density tends to be too high, and the coating film tends to be too hard and brittle and can hardly follow the shrinkage during the curing. If it exceeds the above range, the crosslinking density tends to be inadequate, whereby not only the weather resistance but also the acidic rain resistance and the chemical resistance will be poor.

The fluorine-containing copolymer is incorporated in an amount of from 30 to 90 wt % in the fluorine-containing coating composition. If the amount is less than this range, the characteristics of the fluorine-containing copolymer such as the weather resistance, the acidic rain resistance and the chemical resistance can not effectively be utilized. The amount is preferably from 50 to 90 wt %. Even with an amount of from 30 to 50 wt %, an adequate performance can be obtained if a fluorine-containing copolymer having carboxylic acid groups or a derivative thereof, as the curing agent.

If the amount exceeds the above range, it tends to be difficult to adequately blend the curing agent having carboxylic acid groups or a derivative thereof, whereby it will be difficult to secure the necessary crosslinking density.

The fluorine-containing copolymer to be used in the present invention can be prepared, for example, by copolymerizing a fluoroolefin, a vinyl ether, an ethylenically unsaturated monomer having a hydroxyl group and an ethylenically unsaturated monomer having an epoxy group. The copolymerization can be conducted by a method similar to the method disclosed in Japanese Unexamined Patent Publication No. 34108/1982 or Japanese Patent Application No. 216179/1991.

Further, it is possible to use a fluorine-containing copolymer having hydroxyl groups introduced by saponifying a copolymer of a fluoroolefin, a vinyl ether and a carboxylic acid vinyl ester (sometimes referred to simply as a vinyl ester) or having epoxy groups introduced by a high molecular reaction.

The fluoroolefin for the fluorine-containing copolymer is preferably a compound of the formula (1):

$$CF_2=CFX \qquad (1)$$

wherein X is chlorine, fluorine, a $C_{1-3}$ perfluoroalkyl group or a $C_{1-3}$ perfluoroalkoxy group.

Specifically, it may, for example, be tetrafluoroethylene (TFE), chlorotrifluoroethylene (CTFE), hexafluoropropylene or perfluoropropylvinyl ether. In the present invention, such a fluoroolefin is introduced as fluorine-substituted ethylene units in the copolymer chain of the fluorine-containing copolymer, whereby it is possible to obtain a coating film excellent in the weather resistance, etc. The fluoroolefins may be used alone or in combination as a mixture of two or more of them.

The ethylenically unsaturated monomer to be copolymerized with the fluoroolefin is not particularly limited and may be any copolymerizable monomer such as a vinyl ester, an isopropenyl ether, an allyl ether or an olefin. However, when it is used as a material for coating compositions, it preferably contains a vinyl ether from the viewpoint of the solubility in solvents, the control of the hardness of the coating film and the weather resistance or from the viewpoint of the alternating copolymerizability and the polymerization yield.

Specifically, it may, for example, be an alkylvinyl ether or a cycloalkylvinyl ether having a $C_{2-8}$ alkyl or cycloalkyl group, such as ethyl vinyl ether (EVE) or cyclohexyl vinyl ether (CHVE).

The ethylenically unsaturated monomer having a hydroxyl group may, for example, be a hydroxyalkylvinyl ether such as hydroxybutylvinyl ether (HBVE) or hydroxyethylvinyl ether, a hydroxyalkyl acrylate or methacrylate such as hydroxyethyl methacrylate or hydroxyethyl acrylate, a hydroxyalkylallyl ether such as hydroxyethylallyl ether, allyl alcohol, or a hydroxyalkylisopropenyl ether such as hydroxybutylisopropenyl ether. Among them, a hydroxyalkylvinyl ether or a hydroxyalkylisopropenyl ether, particularly a hydroxyalkylvinyl ether, is preferred from the viewpoint of the copolymerizability with the fluoroolefin.

The ethylenically unsaturated monomer having an epoxy group may, for example, be glycidyl vinyl ether (GVE), a vinyl ether having an alicyclic epoxy group as disclosed in Japanese Patent Application No. 216179/1991, glycidylallyl ether, glycidyl methacrylate or glycidyl acrylate. For the same reason as mentioned above, a vinyl ether type is preferably employed as the ethylenically unsaturated monomer having an epoxy group.

The fluorine-containing copolymer to be used in the present invention may further have functional groups other than the epoxy group, for the purpose of auxiliary crosslinking, pigment dispersibility, etc. As such other functional groups, hydrolyzable organic silicon groups such as alkoxysilyl groups may, for example, be mentioned.

The number average molecular weight of the fluorine-containing copolymer is usually from 3,000 to 100,000. It is preferably from 4,000 to 400,000 from the viewpoint of the strength of the coating film and the viscosity of the solution.

The curing agent having carboxylic acid groups or a derivative thereof to be used for the fluorine-containing coating composition of the present invention, may be a polybasic carboxylic anhydride or a polybasic carboxylic acid, or it may be blocked by other methods. It may be polyfunctional and of a low molecular weight. For example, it may be a polymer compound such as an acrylic resin having carboxylic acid groups. In order to maintain the weather resistance as the characteristic of the fluorine-containing coating composition, it is preferably an aliphatic acid anhydride or anhydrous acid, or an alicyclic acid anhydride, rather than an organic acid anhydride or the like having an unsaturated bond. Otherwise, it is preferred to use a fluorine-containing copolymer having carboxylic acid groups prepared by modifying a fluorine-containing copolymer having hydroxyl groups by such an acid anhydride. The monomers constituting such a fluorine-containing copolymer may, for example, be fluoroolefins of the above formula (1) and the above-mentioned various ethylenically unsaturated monomers polymerizable therewith and the above-mentioned ethylenically unsaturated monomers having hydroxyl groups.

Specifically, it may, for example, be hexahydrophthalic anhydride (HHPA), methylhexahydrophthalic anhydride (MeHHPA), poly(ethyloctadecanedioic)anhydride, polyadipic anhydride, or a fluorine-containing copolymer modified with hexahydrophthalic anhydride.

The curing agent having carboxylic acid groups or a derivate thereof to be used in the fluorine-containing coating composition of the present invention, is preferably incorporated in an amount of from 10 to 70 wt % in the fluorine-containing coating composition. The coating composition contains from 30 to 90 wt % of the above-mentioned fluorine-containing copolymer comprising fluoroolefin units and vinyl ether units and having a hydroxyl value of from 30 to 150 (mgKOH/g) and an epoxy equivalent of from 300 to 2,000 (g/eq). Accordingly, to incorporate the curing agent so that the acid/epoxy group ratio would be from 0.5 to 1.5, preferably from 0.8 to 1.2, in the case of a commonly employed methylhexahydrophthalic anhydride or the like, the amount will be from 10 to 40 wt %, while in the case of a fluorine-containing copolymer modified with hexahydrophthalic anhydride or an acrylic resin having carboxylic acid groups, the amount will be from 40 to 70 wt %. If the amount is less or more than the above range, the acid/epoxy group ratio tends to be remarkably poor and it tends to be difficult to obtain an adequately cured product.

In addition to these main components, the fluorine-containing coating composition of the present invention may further contain an auxiliary crosslinking component capable of reacting with secondary hydroxyl groups formed by a side reaction of acid and epoxy groups or capable of reacting with hydroxyl groups in the fluorine-containing copolymer, an amine or other components having a catalytic function, an ultraviolet absorber, a pigment, a stabilizer, a solvent, a surfactant or other so-called additives for coating materials.

Like conventional coating materials of acrylmelamine type or fluorine-containing melamine type, the fluorine-containing coating composition of the present invention has excellent handling efficiency, coating properties and baking curability as a one-pack type or a semi-one-pack type and weather resistance as well as outstanding acidic rain resistance and chemical resistance. It is useful particularly as a top coating material for automobiles, a coating material for precoated metals or a coating material for domestic use.

Now, the present invention will be described in further detail with reference to Examples. However, it should be understood that the present invention is by no means restricted by such specific Examples.

EXAMPLES 1 TO 6 AND COMPARATIVE EXAMPLES 1 TO 7

As the fluorine-containing copolymer comprising the fluoroolefin and vinyl ether components, the one having a number average molecular weight of 6,000 and the following molar ratio of CTFE/CHVE/GVE/HBVE, was prepared, whereby the copolymer had the following hydroxyl value (mgKOH/g) and epoxy equivalent (g/eq).

F-1: 50/10/20/20; 98 (mgKOH/g); 620 (g/eq)
F-2: 50/10/30/10; 50 (mgKOH/g); 410 (g/eq)
F-3: 50/30/20/0; 0 (mgKOH/g); 640 (g/eq)
F-4: 50/30/0/20; 100 (mgKOH/g); 0 (g/eq)

Then, F-4 was modified by HHPA to obtain F-5 having an acid value of 10 (mgKOH/g) or F-6 having an acid value of 80 (mgKOH/g).

In the same manner, an acrylic resin composed mainly of methyl methacrylate was prepared to obtain A-1 having a hydroxyl value of 90 (mgKOH/g) and an epoxy equivalent of 315 (g/eq) or A-2 having a hydroxyl value of 120 (mgKOH/g) and an acid value of 110 (mgKOH/g). A-1 was obtained by solution polymerization of 34 parts by weight of methyl methacrylate, 21 parts by weight of 2- hydroxyethyl methacrylate and 45 parts by weight of glycidyl methacrylate in xylene. A-2 was obtained by solution polymerization of 30 parts by weight of methyl methacrylate, 25 parts by weight of n-butyl methacrylate, 28 parts by weight of 2-hydroxyethyl methacrylate and 17 parts by weight of methacrylic acid in xylene.

In the combination as identified in Table 1, the fluorine copolymer and a curing agent were blended so that the acid/epoxy group ratio would be about 1.

0.5 part by weight of U-CAT SA102 (manufactured by SAN-APRO Company) as a crosslinking catalyst, 2 parts by weight of TINUVIN #900 (manufactured by Chiba Geigy) as an ultraviolet absorber, 0.5 part by weight of TINUVIN #144 (manufactured by Chiba Geigy) as a light stabilizer and xylene/Solfit AC (manufactured by Kuraray) of 1/1 (weight ratio) as a solvent, were added thereto to obtain a coating composition having a solid content of 50 wt %, which was then coated on a steel plate coated with a white coating material of acrylmelamine type, in a dried coating film thickness of 0.02 mm and then heat-cured at 140° C. for 30 minutes.

As Comparative Example 6, a combination of A-1 and A-2 was processed in the same manner as described above.

As a fluorine-containing melamine type coating material of Comparative Example 7, added to 100 parts by weight of F-5 were 50 parts by weight of Yuban 20SE60 (hereinafter referred to simply as "the melamine resin" manufactured by Mitsui Toatsu), 2 parts by weight of TINUVIN #900 (manufactured by Chiba Geigy) as an ultraviolet absorber, 0.5 part of TINUVIN #144 (manufactured by Chiba Geigy) as a light stabilizer and n-butanol/Solfit AC manufactured by Kuraray) of 1/1 (weight ratio) as a solvent, to obtain a coating composition having a solid content of 50 wt %, which was then coated on a steel plate coated with an acrylmelamine type white coating material, in a dried film thickness of 0.02 mm and then heat-cured at 140° C. for 30 minutes.

TABLE 1

|  | Fluorine-containing copolymer (Parts by weight) | | Curing agent (Parts by weight) | |
| --- | --- | --- | --- | --- |
| Example 1 | F-1 | 79 | MeHHPA | 21 |
| Example 2 | F-1 | 46 | F-6 | 54 |
| Example 3 | F-1 | 55 | A-2 | 44 |
| Example 4 | F-2 | 71 | MeHHPA | 29 |
| Example 5 | F-2 | 37 | F-6 | 63 |
| Example 6 | F-2 | 45 | A-2 | 55 |
| Comparative Example 1 | F-1 | 10 | F-5 | 90 |
| Comparative Example 2 | F-2 | 7 | F-5 | 93 |
| Comparative Example 3 | F-3 | 80 | MeHHPA | 20 |
| Comparative Example 4 | F-3 | 52 | F-6 | 48 |
| Comparative Example 5 | F-3 | 55 | A-2 | 45 |
| Comparative Example 6 | A-1 | 40 | A-2 | 60 |
| Comparative Example 7 | F-5 | 67 | Melamine | 33 |

Evaluation was conducted by the following methods, and the results are shown in Table 2.

Evaluation methods

Compatibility: The coating solution is transparent ○, turbid △, or separated X.

Visual appearance of the coating film: The coating film is transparent and glossy ○, shows slight whitening △, or shows substantial whitening X.

Solvent resistance: The surface of the coating film was rubbed 50 times with a gauze impregnated with xylene. ○: no abnormality observed. X: abnormality observed.

Acid resistance at room temperature: 0.3 cc of 10% sulfuric acid was spotted on the coated surface and left to stand at room temperature for 24 hours, whereby the presence or absence of abnormality was examined. ○:

no abnormality observed. Δ: Slight abnormality observed. X: Abnormality observed.

Acid resistance at a high temperature: 0.3 cc of 10% sulfuric acid was spotted on the coated surface and left to stand at 70° C. for one hour, whereupon the presence or absence of abnormality was examined, ◯: no abnormality observed. Δ: Slight abnormality observed. X: Abnormality observed.

Weatherbility: The coating film was subjected to exposure by a sunshine weather meter for 3,000 hours, whereupon the weather resistance was represented by the gloss-retention rate (%) of the coating film.

TABLE 2

| | Visual appearance | | Solvent resistance | Acid resistance | | Weatherbility |
| | Compatibility | of the coating film | | Room temperature | High temperature | |
|---|---|---|---|---|---|---|
| Example 1 | O | O | O | O | O | 98 |
| Example 2 | O | O | O | O | O | 99 |
| Example 3 | O | O | O | O | O | 96 |
| Example 4 | O | O | O | O | O | 99 |
| Example 5 | O | O | O | O | O | 95 |
| Example 6 | O. | O | O | O | O | 93 |
| Comparative Example 1 | O | O | X | Δ | Δ | 92 |
| Comparative Example 2 | O | O | X | Δ | X | 88 |
| Comparative Example 3 | Δ | O | O | Δ | Δ | 94 |
| Comparative Example 4 | X | X | X | Δ | X | 64 |
| Comparative Example 5 | X | Δ | X | Δ | X | 65 |
| Comparative Example 6 | O | O | O | Δ | X | 42 |
| Comparative Example 7 | O | O | O | O | Δ | 98 |

The fluorine-containing coating composition of the present invention has excellent acid resistance and weather resistance while maintaining good handling efficiency, and it is very useful for the coating of e.g. automobile bodies and household appliances.

We claim:

1. A fluorine-containing coating composition comprising:
   i) 30 to 90 wt. % of a fluorine-containing copolymer obtained by copolymerizing monomers comprising
      a) a fluoroolefin;
      b) a vinyl ether;
      c) an ethylenically unsaturated monomer having a hydroxy group; and
      d) an ethylenically unsaturated monomer having an epoxy group;
      wherein said copolymer has a hydroxyl value of from 30 to 150 (mgKOH/g) and an epoxy equivalent of from 300 to 2,000 (g/eq); and
   (ii) 10 to 70 wt. % of a curing agent selected from the group consisting of a polybasic carboxylic acid, a polybasic carboxylic anhydride, a blocked polybasic carboxylic acid and a mixture thereof.

2. The fluorine-containing coating composition according to claim 1, wherein the fluoroolefin is a compound of the formula (1):

$$CF_2=CFX \qquad (1)$$

wherein X is chlorine, fluorine, a $C_{1-3}$ perfluoroalkyl group of a $C_{1-3}$ perfluoroalkoxy group.

3. The fluorine-containing coating composition according to claim 1, wherein the vinyl ether is an alkylvinyl ether or a cycloalkylvinyl ether.

4. The fluorine-containing coating composition according to claim 1, wherein the ethylenically unsaturated monomer having a hydroxyl group is a hydroxyalkylvinyl ether or a hydroxyalkylisopropenyl ether.

5. The fluorine-containing coating composition according to claim 1, wherein the ethylenically unsaturated monomer having an epoxy group is a vinyl ether having an epoxy group.

* * * * *